United States Patent
Yasuhara

(10) Patent No.: US 8,693,027 B2
(45) Date of Patent: Apr. 8, 2014

(54) IMAGE FORMING APPARATUS HAVING RESTRICTED USER ACCESS, METHOD OF CONTROLLING THE SAME, AND STORAGE MEDIUM

(75) Inventor: Hiroshi Yasuhara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1247 days.

(21) Appl. No.: 12/357,107

(22) Filed: Jan. 21, 2009

(65) Prior Publication Data

US 2009/0185220 A1 Jul. 23, 2009

(30) Foreign Application Priority Data

Jan. 22, 2008 (JP) .................................. 2008-011656

(51) Int. Cl.
*G06K 1/00* (2006.01)

(52) U.S. Cl.
USPC ............................ 358/1.15; 358/434; 358/442

(58) Field of Classification Search
USPC .......... 358/1.1, 1.15, 400, 401, 434, 438, 442
See application file for complete search history.

(56) References Cited

U.S. PATENT DOCUMENTS

| | | | |
|---|---|---|---|
| 7,312,884 B1 * | 12/2007 | Makitani ...................... | 358/1.15 |
| 2005/0007622 A1 * | 1/2005 | Jeong .......................... | 358/1.14 |
| 2005/0083548 A1 | 4/2005 | Suga et al. | |
| 2005/0088689 A1 | 4/2005 | Suga et al. | |
| 2006/0283937 A1 | 12/2006 | Daniel et al. | |
| 2007/0052993 A1 * | 3/2007 | Anno ........................... | 358/1.14 |
| 2008/0024818 A1 * | 1/2008 | Ito ................................ | 358/1.15 |

FOREIGN PATENT DOCUMENTS

| | | |
|---|---|---|
| EP | 1530112 A2 | 5/2005 |
| JP | 2003-211793 A | 7/2003 |
| JP | 2007-21810 A | 2/2007 |
| JP | 2007-174062 A | 7/2007 |
| JP | 2007-328462 A | 12/2007 |
| KR | 10-2005-0016497 A | 2/2005 |
| WO | 03103285 A1 | 12/2003 |

OTHER PUBLICATIONS

Search Report issued in corresponding European application 09151030.5-2212 dated May 15, 2009.
JP Office Action issued Sep. 25, 2012 for corres. JP 2008-011656.

* cited by examiner

*Primary Examiner* — Thomas D Lee

(74) *Attorney, Agent, or Firm* — Rossi, Kimms & McDowell LLP

(57) ABSTRACT

An image forming apparatus which makes it possible to provide restricted access thereto without requiring an information processing apparatus to have a special authentication function. The image forming apparatus receives authentication information input by a user using a user interface, and receives a connection request transmitted from the information processing apparatus. When receiving the connection request, the image forming apparatus determines whether or not the user has been authenticated based on the received authentication information. If the user has been authenticated, the image forming apparatus permits execution of processing from the information processing apparatus thereto, whereas if not, it refuses execution of processing from the information processing apparatus.

9 Claims, 6 Drawing Sheets

FIG. 5

| 501 | 502 | 503 | 504 | 505 |
|---|---|---|---|---|
| 1 | LLS | FALSE | A123 | 1234 |
| 2 | RLS | | | 2143 |
| 3 | LLS | TRUE | | 4567 |
| 4 | RLS | | | 4321 |
| 5 | RLS | | | 5678 |

FIG. 6

| 601 | 602 | 603 | 604 | 605 |
|---|---|---|---|---|
| 1234 | Yasuhara | DomainA | 1 | yasu@domaina |
| 4567 | Hanako | DomainA | 2 | hanako@domaina |
| 2143 | Yokoyama | DomainA | 5 | yoko@domaina |
| 4321 | UserB | DomainB | 3 | userb@domaina |

IMAGE FORMING APPARATUS HAVING RESTRICTED USER ACCESS, METHOD OF CONTROLLING THE SAME, AND STORAGE MEDIUM

BACKGROUND OF THE INVENTION

1. Field of the Invention

The present invention relates to an image forming apparatus having the function of providing restricted user access thereto, a method of controlling the same, and a storage medium.

2. Description of the Related Art

Recently, a limited access function has come to be provided for (added to) an image forming apparatus for the purposes of security and cost management (see e.g. Japanese Patent Laid-Open Publication No. 2007-21810). Although there are various methods of restricting access to an image forming apparatus, it is a general practice to authenticate a user who is going to access the image forming apparatus, and permit the user to access the same only when properly authenticated.

Further, recently, an information processing apparatus, such as a digital still camera, and an image forming apparatus have come to be provided with functions which make it possible for the information processing apparatus to be directly connected to the image forming apparatus and transmit an instruction and data for outputting an image to the image forming apparatus, and for the image forming apparatus to output the image.

Authentication functions installed in image forming apparatuses are various in type, and the methods of communication and processing, such as encryption used for input information and authentication, depend on the authentication protocol or authentication method. On the other hand, there are lots of information processing apparatuses, such as digital still cameras, which are not provided with an authentication device itself or an authentication function equivalent to any of the various authentication functions installed in the image forming apparatuses.

In an information processing system comprised of such an image forming apparatus and such an information processing apparatus as mentioned above, there can be a case where the image forming apparatus can be accessed and used by transmitting an image output instruction to the image forming apparatus from the information processing apparatus.

More specifically, when the restricted access to the image forming apparatus is provided only via the user interface of the image forming apparatus, it is impossible to provide the restricted access to the user interface of the information processing apparatus, which is an external apparatus connected to the image forming apparatus. In short, there can occur a situation in which it is impossible to fully implement security and cost management, which are objectives of restricted access to the image forming apparatus.

In the above-mentioned Japanese Patent Laid-Open Publication No. 2007-21810, the image forming apparatus and the information processing apparatus, such as a digital still camera, are configured to store unique information, and the image forming apparatus is permitted to be accessed only when respective pieces of the unique information stored in the apparatuses are collated and determined to match each other That is, the image forming apparatus is permitted to be accessed only when authentication between apparatuses is successful, whereby the restricted access to the image forming apparatus is provided.

However, the technique disclosed in Japanese Patent Laid-Open Publication No. 2007-21810 requires a particular image forming apparatus, and an information processing apparatus compatible therewith, which limits the range of apparatuses for which restricted access can be provided. Furthermore, the technique disclosed in Japanese Patent Laid-Open Publication No. 2007-21810 is configured such that the access to an apparatus is permitted or not permitted, on an apparatus basis, but without identification of a user who is going to access the apparatus, and hence there is a fear that an unauthorized user accesses the apparatus.

SUMMARY OF THE INVENTION

The present invention provides an image forming apparatus which makes it possible to provide restricted access thereto without requiring an information processing apparatus to have a special authentication function, a method of controlling the image forming apparatus, and a storage medium.

In a first aspect of the present invention, there is provided an image forming apparatus provided with a user interface, comprising a first reception unit adapted to receive authentication information input using the user interface, a second reception unit adapted to receive a connection request transmitted from an information processing apparatus, a determination unit adapted to determine whether or not a user has been authenticated by the image forming apparatus based on the authentication information received by the first reception unit, when the second reception unit receives the connection request, and a control unit adapted to permit execution of processing from the information processing apparatus if it is determined by the determination unit that the user has been authenticated by the image forming apparatus, and refuse execution of processing from the information processing apparatus if it is not determined by the determination unit that that the user has been authenticated by the image forming apparatus.

In a second aspect of the present invention, there is provided a method of controlling an image forming apparatus provided with a user interface, comprising receiving authentication information input using the user interface, receiving a connection request transmitted from an information processing apparatus, determining whether or not a user has been authenticated by the image forming apparatus based on the received authentication information, when the connection request is received, and permitting execution of processing from the information processing apparatus if it is determined by the determination that the user is authenticated, and refusing execution of processing from the information processing apparatus if it is not determined by the determination that the user is authenticated.

In a third aspect of the present invention, there is provided a computer-readable storage medium storing a program for causing a computer to execute a method of controlling an image forming apparatus provided with a user interface, wherein the method comprises receiving authentication information input using the user interface, receiving a connection request transmitted from an information processing apparatus, determining whether or not a user has been authenticated by the image forming apparatus based on the received authentication information, when the connection request is received, and permitting execution of processing from the information processing apparatus if it is determined by the determination that the user is authenticated, and refusing execution of processing from the information processing apparatus if it is not determined by the determination that the user is authenticated.

According to the image forming apparatus of the present invention, it is possible to provide restricted access to the image formatting apparatus without requiring an information processing apparatus to have a special authentication function.

The features and advantages of the invention will become more apparent from the following detailed description taken in conjunction with the accompanying drawings.

BRIEF DESCRIPTION OF THE DRAWINGS

FIG. 5 is a view showing an example of a session management table for managing authentication sessions in the image forming apparatus shown in FIG. 1.

FIG. 6 is a view showing an example of a context table which shows login contexts of respective users authenticated by the image forming apparatus shown in FIG. 1.

DETAILED DESCRIPTION OF THE EMBODIMENTS

The present invention will now be described in detail below with reference to the accompanying drawings showing an embodiment thereof.

Figure 1:
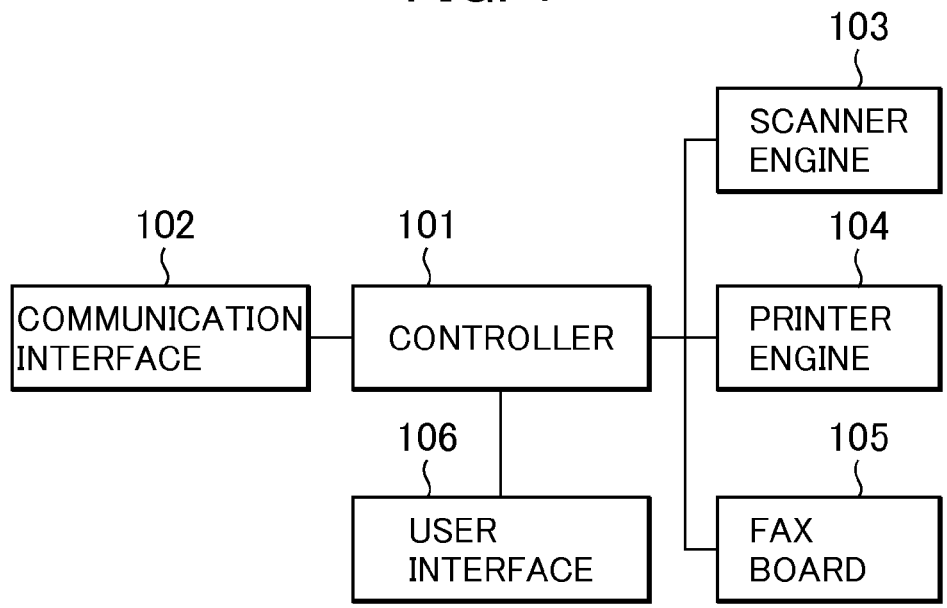
FIG. 1 is a block diagram of an image forming apparatus according to an embodiment of the present invention.

FIG. 1 is a block diagram of an image forming apparatus according to an embodiment of the present invention.

As shown in FIG. 1, the image forming apparatus according to the present embodiment is implemented by a multifunction machine with a user authentication function, and prints an image by receiving a print instruction from an information processing apparatus directly connected thereto.

The image forming apparatus includes a controller 101 for controlling the overall operation of the apparatus, and a communication interface 102 via which the controller 101 communicates with the outside of the image forming apparatus. The communication interface 102 may be e.g. a USB interface, an Ethernet (registered trademark) interface, or an IEEE1284 interface, or any other suitable communication interface.

Further, the image forming apparatus also includes a scanner engine 103 and a printer engine 104, both of which are controlled by the controller 101. The printer engine 104 may be e.g. a laser beam printer or an inkjet printer, or any other suitable printer.

Further, the image forming apparatus includes a FAX board 105 controlled by the controller 101, for realizing FAX functions, including communication control during transmission and reception of image data.

Further, the image forming apparatus includes a user interface 106. The user interface 106 is comprised of an LCD (Liquid Crystal Display), a keyboard, etc. The user interface 106 displays information from the controller 101, and transmits an instruction from the user to the controller 101. In the user interface 106, the LCD is equipped with a touch panel function, which makes it possible to receive inputs from the user.

The image forming apparatus configured as above makes it possible to select the printer engine 104 to issue a print job. Further, the image forming apparatus makes it possible to select the scanner engine 103 to issue a scan job.

Further, the image forming apparatus makes it possible to select the printer engine 104 and the scanner engine 103 to issue a copy job. Further, the image forming apparatus makes it possible to select the printer engine 104, the scanner engine 103, and the FAX board 105 to issue an FAX reception job and a FAX transmission job.

The controller 101 makes it possible to obtain data of an original via the communication interface 102 and use the printer engine 104 to issue a print job. Further, the controller 101 makes it possible to obtain data of an original via the communication interface 102 to issue a FAX transmission job.

Figure 2:
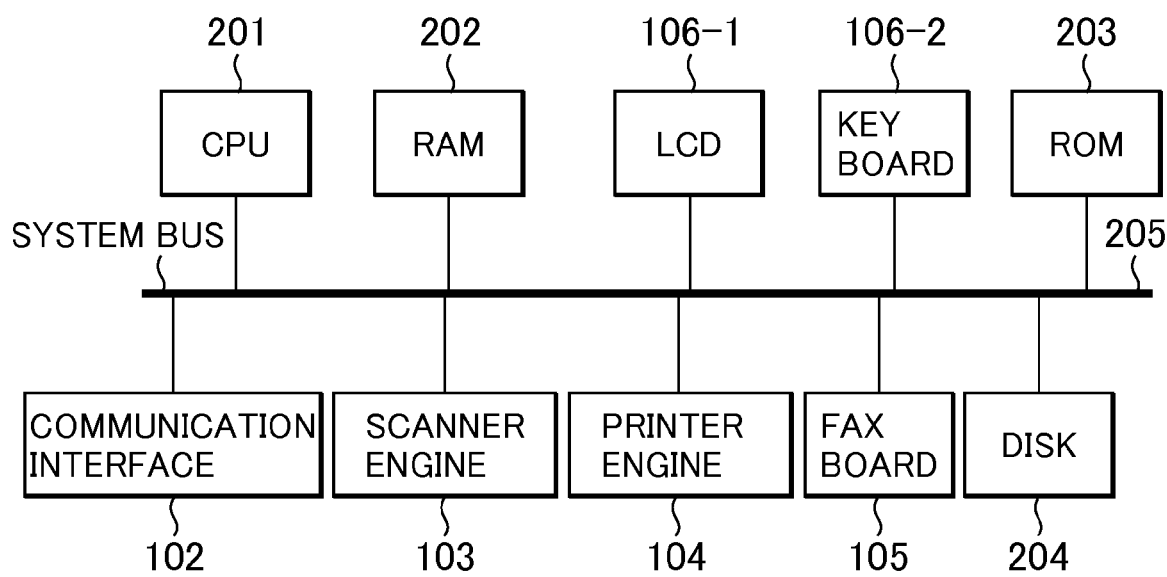
FIG. 2 is a block diagram showing the hardware configuration of a controller and controller-related parts of the image forming apparatus concerning appearing in FIG. 1.

FIG. 2 is a block diagram showing the hardware configuration of the controller 101 and controller-related parts of the image forming apparatus concerning appearing in FIG. 1.

A CPU 201, a RAM 202, and a ROM 203 appearing in FIG. 2 form the controller 101 appearing in FIG. 1. Further, an LCD 106-1 and a keyboard 106-2 forms the user interface 106 in FIG. 1. The hardware devices appearing in FIG. 2 are connected to each other via a system bus 205.

A program for controlling the controller 101 is stored in the ROM 203 or a disk (hard disk or the like) 204, and is read out into the RAM 202, as required, so as to be executed by the CPU 201.

Further, the ROM 203 and the disk 204 store not only the control program but also information on the functions and states of the image forming apparatus, attribute information on jobs to be processed by the image forming apparatus, job data to be output by the image forming apparatus, and so forth.

Further, the CPU 201 performs display via the LCD 106-1, and receives user instructions from the LCD 106-1 or the keyboard 106-2. Further, the CPU 201 communicates with the outside of the image forming apparatus via the communication interface 102.

In the present embodiment, unless otherwise specified, the CPU 201 receives a user input from the keyboard 106-2 via the system bus 205. Further, the CPU 201 controls the RAM 202, the LCD 106-1, the ROM 203, the communication interface 102, the scanner engine 103, the printer engine 104, the FAX board 105, and the disk 204.

Figure 3:
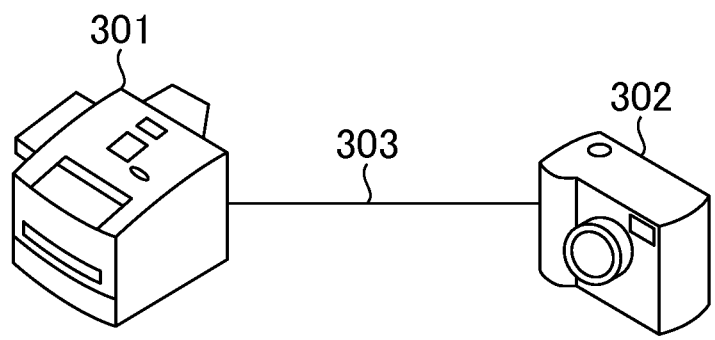
FIG. 3 is a view showing a first example of an information processing system in which the image forming apparatus shown in FIG. 1 and an information processing apparatus are connected to each other.

FIG. 3 is a view showing a first example of an information processing system in which the image forming apparatus shown in FIG. 1 and the information processing apparatus are connected to each other.

In FIG. 3, an image forming apparatus 301 and a digital camera 302 as the information processing apparatus are connected via a USB cable 303. The digital camera 302 has the function of storing picked-up image data in an internal recording medium.

The information processing system is configured such that when image data stored in the recording medium within the digital camera 302 is transmitted to the image forming apparatus 301 by a user operation from the digital camera 302, the image forming apparatus 301 generates drawing data based on the image data, forms an image based on the drawing data, and transfers the image to a sheet, to thereby finally obtain a printout.

Although in the illustrated examples of the present embodiment, the USB cable 303 is used as a connection interface for connection between the image forming apparatus 301 and the digital camera 302, this is not limitative, but a means used in combination with another protocol, such as a wireless, a Bluetooth, or the like, may be used as the connection interface.

Figure 4:
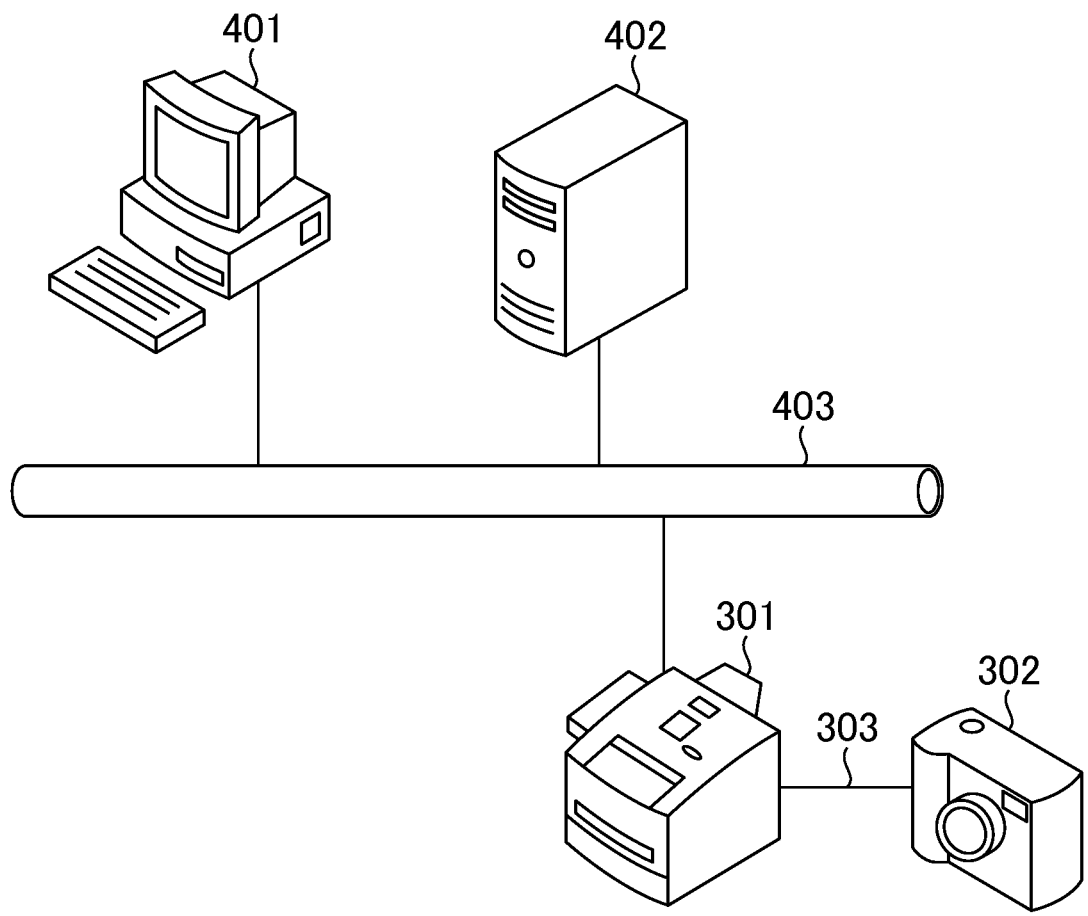
FIG. 4 is a view showing a second example of the information processing system in which the image forming apparatus shown in FIG. 1 and information processing apparatuses are connected to each other.

FIG. 4 is a view showing a second example of the information processing system in which the image forming apparatus shown in FIG. 1 and information processing apparatuses are connected to each other.

As shown in FIG. 4, the image forming apparatus 301 is capable of being connected to the digital camera 302 as the information processing apparatus via the USB cable 303, similarly to the example shown in FIG. 3, and is also connected to a client PC 401 as another information processing apparatus and an authentication server 402 via a network 403.

The client PC 401 transmits image data to the image forming apparatus 301 via the network 403. Authentication information input from the user interface of the image forming apparatus 301 or the client PC 401 is transmitted to the authentication server 402 via the network 403. The authentication server 402 performs authentication processing, and then transmits the result of the authentication processing to the image forming apparatus 301 or the client PC 401.

The image forming apparatus 301 accepts information input from the user, via the user interface 106, and performs communication with the authentication server 402 via the communication interface 102, for authentication purposes.

In a state where the authentication has not been successfully performed, a screen for use in inputting authentication information is displayed on the LCD 106-1 of the image forming apparatus 301. The user can input authentication information via the keyboard 106-2.

When the authentication has been successfully performed, a screen for use in operating the image forming apparatus 301 is displayed on the LCD 106-1, which enables the user to operate the image forming apparatus 301, for copying, scanning, printing, and so forth.

Although in the present embodiment, the image forming apparatus 301 performs authentication by a method of transmitting authentication information to the authentication server 402 via the network 403 and thereby acquiring an authentication result (corresponding to the example of the information processing system shown in FIG. 4), the method of authentication and the configuration of authentication are not limited to those described in detail as to the present embodiment. For example, a method of authentication may be employed in which the image forming apparatus 301 is internally provided with a function equivalent to that of the authentication server 402 and does not use the authentication server 402 or the network (corresponding to the example of the information processing system shown in FIG. 3).

Further, although in the present embodiment, the image forming apparatus 301 is inhibited from being used unless the authentication is successful, the manner of control of the authentication screen is not limited to that of the present embodiment. For example, a method may be employed in which after the user has given a scan instruction, a print instruction, or the like, to the image forming apparatus 301, unless the user has been successfully authenticated, the authentication screen or an error message is displayed.

Further, the image forming apparatus 301 can be operated not only via the user interface 106 thereof, but also from the client PC 401 by connection to the image forming apparatus 301 via the network 403.

It should be noted that detailed description of a user operation of the image forming apparatus 301 from the client PC 401, and an authentication function required for the operation is omitted.

FIG. 5 is a view showing an example of a session management table for managing authentication sessions in the image forming apparatus shown in FIG. 1.

As shown in FIG. 5, the session management table includes a column of boxes each for entry of an index 501 indicative of a session, and a column of boxes each for entry of an authentication type 502. There are two authentication types 502 for entry in associated boxes: LLS which is short for Locally Logged-in Session and designates that a user has been authenticated via the user interface 106 (Local User Interface), and RLS which is short for Remotely Logged-in Session and designates that a user has been authenticated through connection from the client PC 401 via the communication interface 102.

A LUI (Local User Interface)-login state 503 entered in a box of a column therefor indicates whether or not a user is in a state logged-in via the user interface 106 (Local User Interface). TRUE designates that the user is in a logged-in state, i.e. a state where the authenticated state of the user authenticated via the user interface 106 is maintained to thereby permit the user to use the user interface 106, and FALSE designates that the user is in a logged-out state, i.e. a state where the authenticated state of the user authenticated via the user interface 106 is cancelled to thereby inhibit the user from using the user interface 106.

A device session ID 504 stored in each box of a column for entry thereof indicates a session ID which is created when an information processing apparatus is connected to the image forming apparatus and is maintained so long as the information processing apparatus is connected. A context ID 505 which corresponds to user information and is unique to each user is stored in each box of a column therefor in association with the corresponding index.

In the case of a logged-in session through authentication from the client PC 401 indicated by RLS as the authentication type 502, each index and information items associated therewith in the management table are discarded when a remote operation of the image forming apparatus from the client PC 401 is terminated and the session is closed to cause the user to log out from the image forming apparatus. Further, in the case of a logged-in session through authentication from the local user interface (the user interface 106) indicated by LLS as the authentication type1 502, each index and information items associated therewith are also discarded when the user is logged-out from the LUI (local user interface), and at the same time, there is no actual session between the image forming apparatus and an information processing apparatus.

For example, in Index 3 appearing in FIG. 5, LLS as the authentication type 502 indicates that a user is authenticated via the user interface 106, and TRUE in the associated box of the LUI-login state 503 indicates that the use is currently in the state logged-in to the LUI.

In Indexes 2, 4, and 5, RLS as the authentication type 502 indicate that users are authenticated through remote log-in, and their different context IDs 505 indicate that the users different from each other are remotely operating the image forming apparatus.

Further, in Index 1, LLS indicates that a user is authenticated through the local user interface (user interface 106), but FALSE in the associated box of the LUI-login state 503 indicates that the use has been caused to log out from the user interface 106 of the image forming apparatus 301. Further, an entry of the associated device session ID 504 indicates that the user of Index 1 is operating an information processing apparatus.

FIG. 6 is a view showing an example of a context table which shows login contexts of respective users authenticated by the image forming apparatus shown in FIG. 1.

As shown in FIG. 6, the context table includes a column of boxes each for entry of a context ID 601, a column of boxes each for entry of an identifier 602 of a user, a column of boxes each for entry of a domain 603 to which the user belongs, a column of boxes each for entry of a department ID 604 used in department management, and a column of boxes each for entry of an email address 605 of the user. The context ID 601, identifier 602, domain 603, department ID 604, and email address 605 of a user form a login context, referred to hereinafter, of the user.

For example, it is understood that the user indicated by Index 1 shown in FIG. 5 is associated with a user identifier of Yasuhara, a domain of Domain A, a department ID of 1, and an email address of yasu@domaina.

The above information is utilized for functions of dealing with user-specific information, such as history of a user operation of the image forming apparatus 301 and restricted access to the same. Further, a set of each context ID and information associated therewith in the context table shown in FIG. 6 pairs up with the corresponding index of the session management table shown in FIG. 5, and when the corresponding index is deleted from the session management table, the set of the context ID and information associated therewith pairing up therewith is also deleted from the context table.

Further, in the present invention, items of information to be set forth in the context table are not limited to the domain 603, the department ID 604 for department management, the email address 605 of a user, and so forth, used in the present embodiment, but other attribute information specific to each user may be added as an item in the table, and at the same time an item or items of information in the present embodiment may be omitted.

Figure 7:
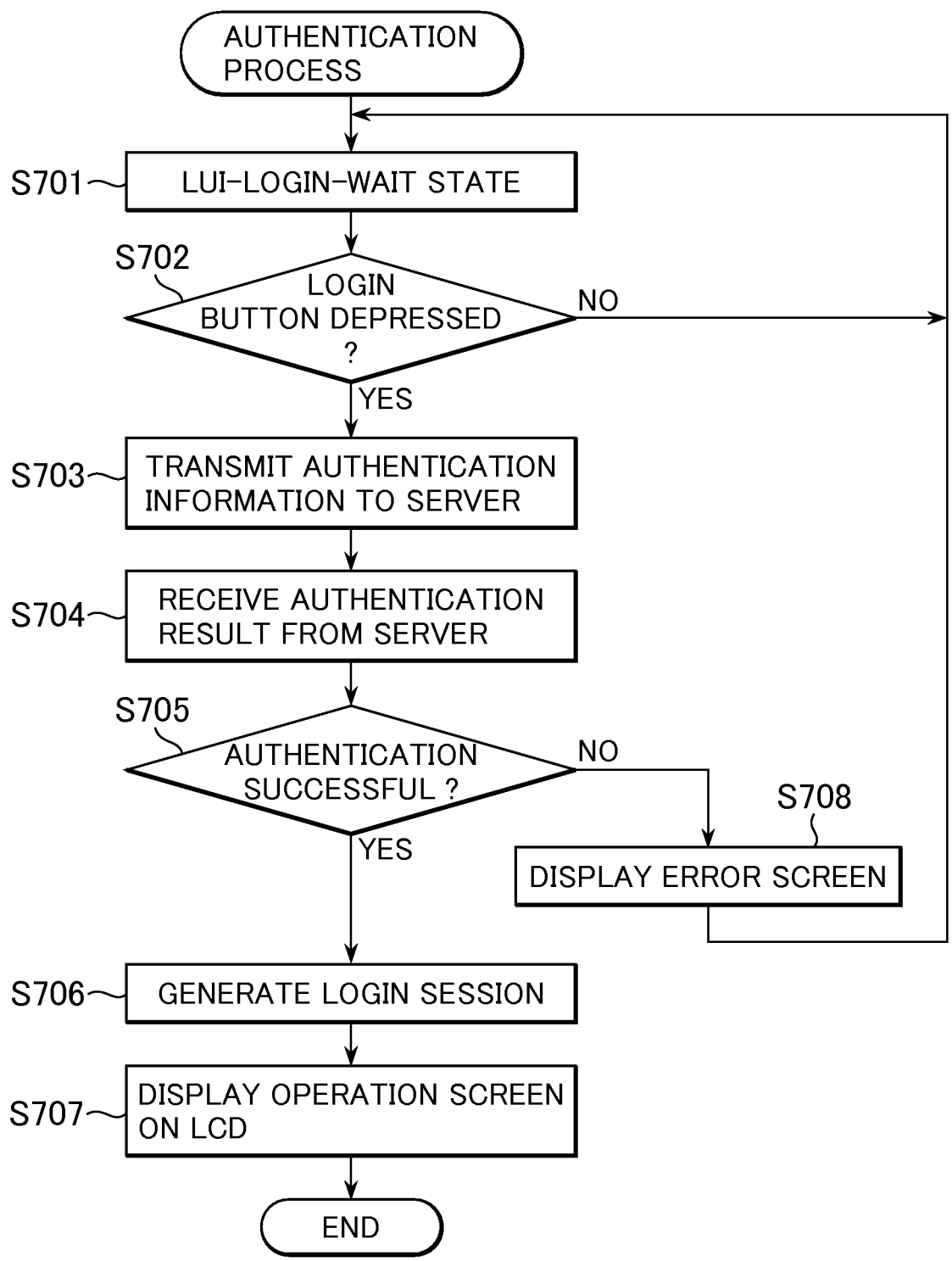
FIG. 7 is a flowchart of an authentication process executed by the image forming apparatus.

FIG. 7 is a flowchart of an authentication process executed by the image forming apparatus shown in FIG. 1.

The present process is executed by the controller 101 appearing in FIG. 1, more specifically by the CPU 201 appearing in FIG. 2.

As shown in FIG. 7, the authentication process is initially in a LUI-login-wait state (step S701). In this step S701, an input screen for inputting authentication information is displayed on the LCD 106-1, and input of authentication information from the user is accepted via the keyboard 106-2.

Next, in a step S702, it is determined whether or not a login button, not shown, is depressed. If the login button is not depressed, the process returns to the step S701 to continue the LUI-login-wait state.

If the login button is depressed, the process proceeds to a step S703, wherein the authentication information is transmitted to the authentication server 402. In the following step S704, the result of the authentication is received from the authentication server 402.

In a step S705, it is determined whether or not the authentication is successful. If the authentication is successful, the process proceeds to a step S706, wherein a login session is generated. If the authentication is not successful in the step S705, the process proceeds to a step S708, wherein an error screen is displayed. After the error screen has been displayed in the step S708, the process returns to the step S701 to resume the LUI-login-wait state.

In generating a login session in the step S706, a new session is added to the session management table shown in FIG. 5. More specifically, an index 501 indicating the session is added, and the authentication type 502 is set to LLS since the authentication is performed via the user interface 106. Furthermore, since the user is in the state logged-in to the LUI, the LUI-login state 503 is set to TRUE.

Further, information received from the authentication server 402 simultaneously with the result of the authentication is configured to contain the identifier, domain name, department ID, and email address of the user. A login context of the user including a context ID uniquely prepared for the user is generated based on the user information, and is added to the context table shown in FIG. 6. The context ID is set to the session management table shown in FIG. 5 and the context table shown in FIG. 6 as the context IDs 505 and 601, respectively.

Next, the process proceeds to a step S707, wherein an operation screen is displayed. More specifically, the screen displayed on the LCD 106-1 is switched from one displaying the LUI-login-wait state to an operation screen for operating the image forming apparatus 301, followed by terminating the authentication process.

Figure 8:
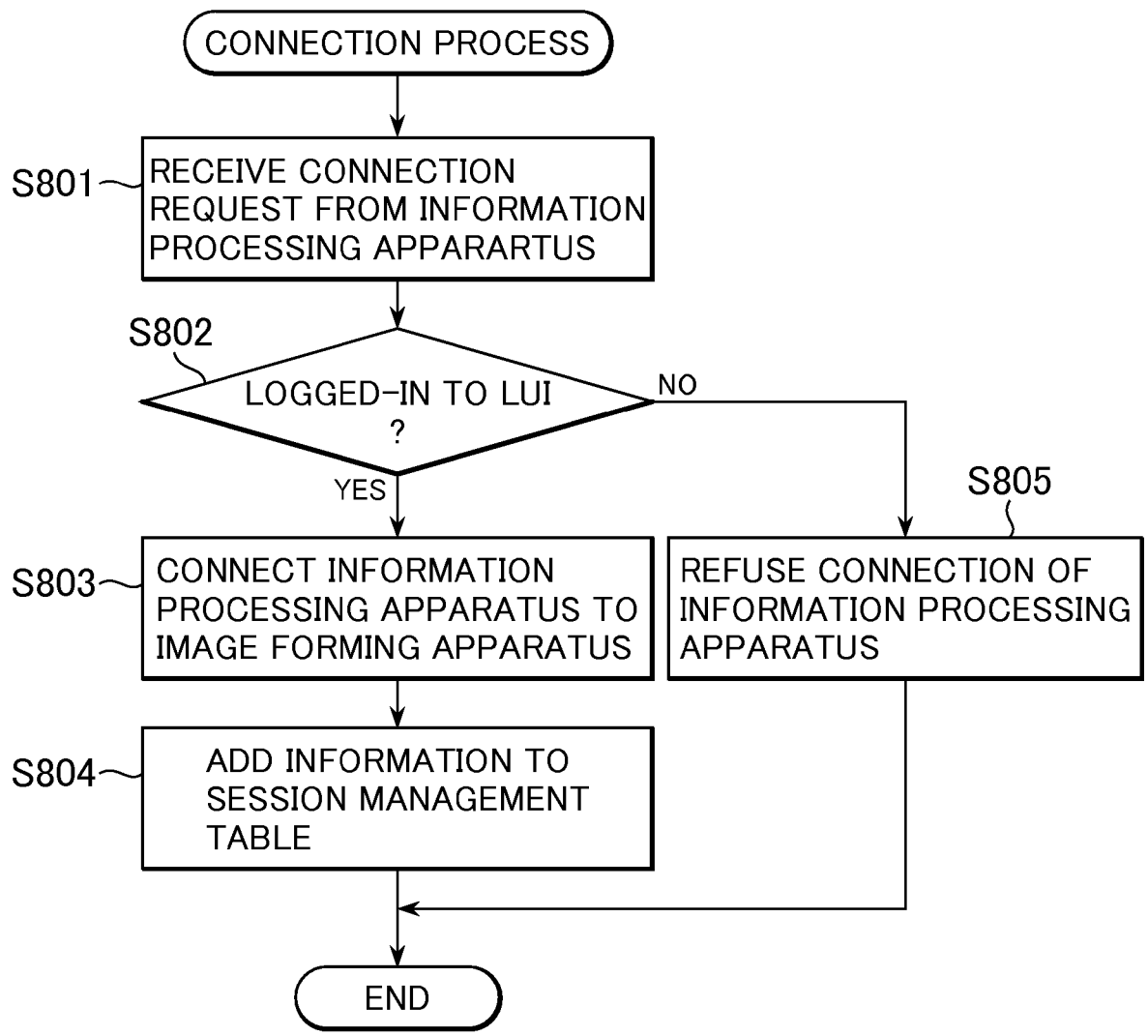
FIG. 8 is a flowchart of a connection process executed by the image forming apparatus in the information processing system shown in FIG. 4, for connection between the image forming apparatus and the information processing apparatus (digital camera).

FIG. 8 is a flowchart of a connection process executed by the image forming apparatus in the information processing system shown in FIG. 4, for connection between the image forming apparatus and the information processing apparatus (digital camera).

As shown in FIG. 8, in a step S801, the image forming apparatus 301 receives a connection request from the information processing apparatus 302. When the information processing apparatus 302 and the image forming apparatus 301 are connected by the connection interface (USB cable) 303, the connection request is transmitted from the information processing apparatus 302 to the image forming apparatus 301.

Upon reception of the connection request from the information processing apparatus 302 via the communication interface 102, the process proceeds to a step S802, wherein the LUI-login state of the user is determined. That is, in the step S802, it is determined whether or not the authentication process in FIG. 7 is terminated and the user is in the state logged-in to the LUI (user interface 106). More specifically, it is determined whether or not the FIG. 5 session management table contains an entry of a session whose LUI-login state 503 is TRUE.

If it is determined in the step S802 that there is a session whose LUI-login state 503 is TRUE, it is judged that the user is in the state logged-in to the LUI, so that the process proceeds to a step S803, wherein an information processing apparatus-connecting process, i.e. a process for connecting the digital camera 302 to the image forming apparatus 301 in the case of the illustrated example is started.

If it is determined in the step S802 that there is no session whose LUI-login state 503 is TRUE, it is judged that there is no user in the state logged in to the LUI, so that the process proceeds to a step S805, wherein connection to the information processing apparatus is refused.

After connecting the image forming apparatus 301 and the information processing apparatus 302 to each other by the information processing apparatus-connecting process in the step S803, information on the connection of the information processing apparatus 302 is added to the session management table in a step S804.

More specifically, in the step S804, a device session ID 504 indicative of a connection session between the image forming apparatus 301 and the information processing apparatus 302 is uniquely generated and is added to the FIG. 5 session management table. This completes the process for connection between the image forming apparatus 301 and the information processing apparatus 302.

In the step S805 of refusing the connection to the information processing apparatus, an error is returned in response to the connection request from the information processing apparatus 302, followed by terminating the present process.

The above-described process makes it possible to connect the image forming apparatus 301 to the information processing apparatus 302 only in a state in which the user is logged in to the LUI.

Figure 9:
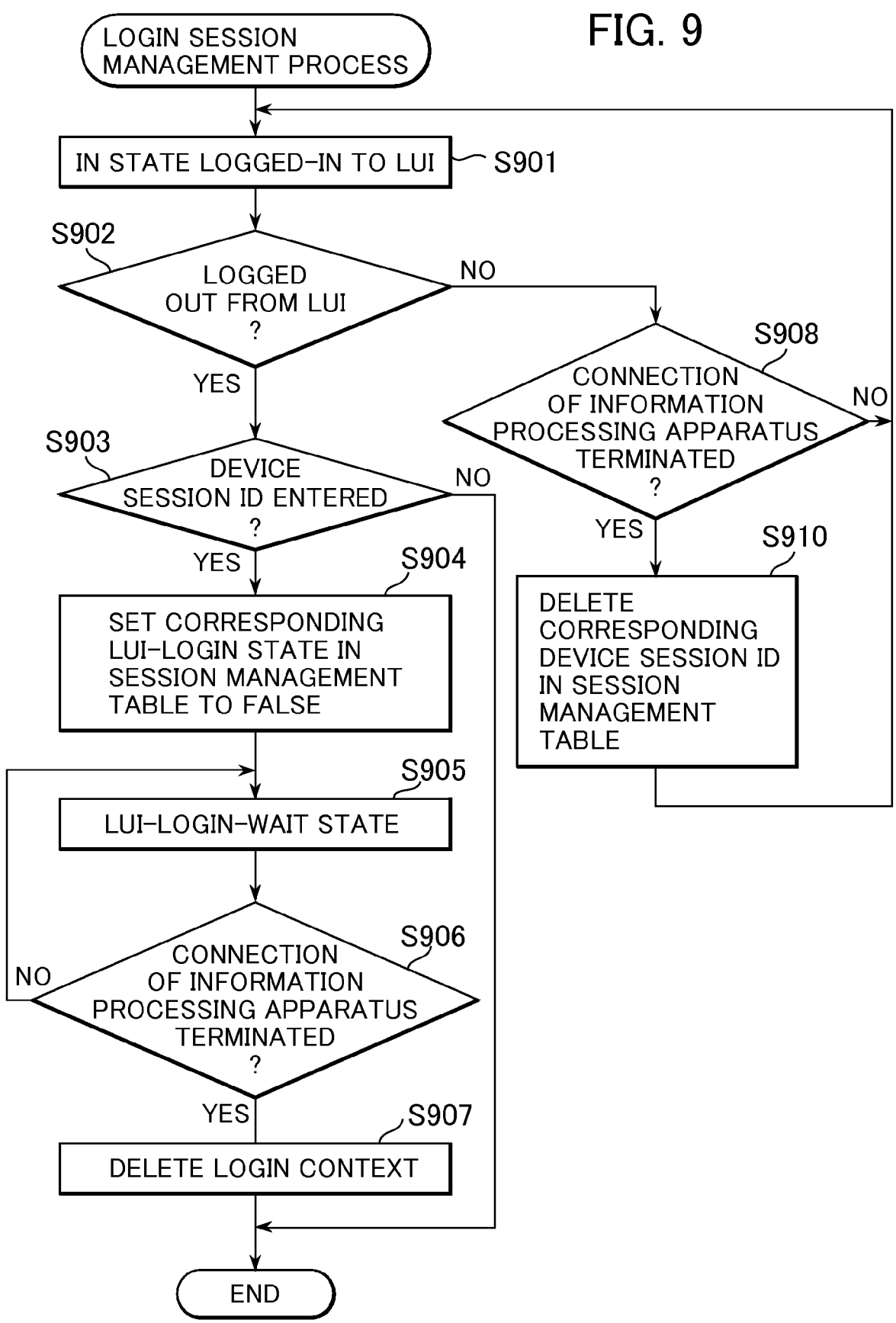
FIG. 9 is a flowchart of a login session management process executed by the image forming apparatus in the information processing system shown in FIG. 4, concerning the connection between the image forming apparatus and the information processing apparatus.

FIG. 9 is a flowchart of a login session management process executed by the image forming apparatus 301 in the information processing system shown in FIG. 4, concerning the connection between the image forming apparatus and the information processing apparatus.

A step S901 corresponds to a state in which the connection process for connection between the image forming apparatus 301 and the information processing apparatus 302, described with reference to FIG. 8, has been successfully completed and the user has been logged-in to the LUI.

In a step S902, it is determined whether or not the user has logged out from the LUI. If the user has logged out from the LUI, the process proceeds to a step S903. If the user has not logged out from the LUI, the process proceeds to a step S908, wherein it is determined whether or not the connection of the information processing apparatus 302 to the image forming apparatus 301 has been terminated.

If it is determined in the step S908 that the connection of the information processing apparatus 302 has been terminated, the process proceeds to a step S910, wherein the corresponding device session ID 504 of the FIG. 5 session management table is deleted.

Then, the process returns from the step S910 to the step S901, wherein the user is in the state logged-in to the LUI.

In the step S903, it is determined whether or not there is a device session ID 504 entered to the session management table in FIG. 5 in association with the context ID 505 of the user who has just logged out and the LUI-login state 503 which remains TRUE. If there is such a device session ID 504, the LUI-login state 503 associated therewith in the session management table is set to FALSE (step S904), and the process proceeds to a step S905, wherein the image forming apparatus 301 is placed in the LUI-login-wait state.

If it is determined in the step S903 that there is no such a device session ID 504, the process proceeds to a step S909, wherein the items of information on a session of the user who has just logged out, i.e. a set of entries including the context ID 505 corresponding to the user and the LUI-login state 503 which remains set to TRUE are deleted from in the FIG. 5 session management table, and the login context including the corresponding context ID 601 is deleted from the FIG. 6 context table, followed by terminating the present process.

In the step S905, the image forming apparatus 301 is placed in the LUI-login-wait state, which is similar to the state in the step S701 of the FIG. 7 authentication process. However, in the state of the image forming apparatus 301 in the step S905, image data can be output from the information processing apparatus 302 since the device session ID 504 exists, and the image forming apparatus 301 is in the state connected to the information processing apparatus 302. Further, another user can log in to perform local copy. As a result, processing concerning the output of the image data from the information processing apparatus 302 is stored as a log of the user who has logged in to the image forming apparatus 301 when the image processing apparatus 302 is connected thereto. On the other hand, processing concerning the local copy is stored as a log of another user who has currently logged in to the image forming apparatus. Thus, the processing executed from the information processing apparatus 302 and the processing (local job) directly executed by operating the image forming apparatus 301 are stored as respective different logs of different users.

The step S905 corresponds to the function of permitting, after authentication of a first user, a process for authentication of a second user during use of the image forming apparatus 301 by the first user via the information processing apparatus 302.

In the following step S906, it is determined whether or not the connection of the information processing apparatus 302 to the image forming apparatus 301 is terminated. If it is determined that the connection of the information processing apparatus 302 is terminated, the process proceeds to a step S907, wherein items of information on the session of the user associated with the information processing apparatus 302 whose connection to the image forming apparatus 301 has just been terminated, i.e. a set of entries including the device session ID 504 corresponding to the user are deleted from the FIG. 5 session management table, and the login context including the corresponding context ID 601 is deleted from the FIG. 6 context table, followed by terminating the present process.

It is to be understood that the present invention may also be accomplished by supplying a system or an apparatus with a storage medium in which a program code of software, which realizes the functions of each of the above described embodiments, is stored, and causing a computer (or CPU or MPU) of the system or apparatus to read out and execute the program code stored in the storage medium.

In this case, the program code itself read from the storage medium realizes the functions of each of the above described embodiments, and therefore the program code and the storage medium in which the program code is stored constitute the present invention.

Examples of the storage medium for supplying the program code include a floppy (registered trademark) disk, a hard disk, a magnetic-optical disk, optical disks, such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network.

Further, it is to be understood that the functions of each of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of each of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-011656 filed Jan. 22, 2008, which is hereby incorporated by reference herein in its entirety.

What is claimed is:

1. An image forming apparatus provided with a local user interface, comprising:
    a first reception unit adapted to receive authentication information input using the local user interface;
    a second reception unit adapted to receive a connection request transmitted from an information processing apparatus;
    a determination unit adapted to determine whether or not a user has been authenticated by the image forming apparatus based on the authentication information received by said first reception unit, when said second reception unit receives the connection request; and
    a control unit adapted to permit execution of processing from the information processing apparatus if it is determined by said determination unit that the user has been authenticated by the image forming apparatus based on the authentication information received by said first reception unit, and refuse execution of processing from the information processing apparatus if it is not determined by said determination unit that that the user has been authenticated by the image forming apparatus,
    wherein the image forming apparatus is capable of communicating with an external apparatus, and the control unit refuses execution of processing from the information processing apparatus if it is determined by said determination unit that the user has been authenticated by the image forming apparatus based on authentication information transmitted from the external apparatus instead of the authentication information received by the first reception unit.

2. The image forming apparatus according to claim 1, comprising a permitting unit adapted to permit, after authentication of a first user, a process for authentication of a second user during use of the image forming apparatus by the first user via the information processing apparatus.

3. The image forming apparatus according to claim 1, comprising:
    a cancellation unit adapted to cancel an authenticated state of the user authenticated by the image forming apparatus when the image forming apparatus is in a state connected to the information processing apparatus; and
    a management unit adapted to manage, when the authenticated state is canceled by said cancellation unit, the cancellation of the authenticated state of the user and the state connected to the information processing apparatus.

4. The image forming apparatus according to claim 1, wherein the information processing apparatus is a digital camera, and the image forming apparatus performs image formation based on image data transmitted from the digital camera.

5. A method of controlling an image forming apparatus provided with a local user interface, comprising:
    receiving a connection request transmitted from an information processing apparatus;
    determining whether or not a user has been authenticated by the image forming apparatus based on authentication information received via the local user interface, when the connection request is received; and
    permitting execution of processing from the information processing apparatus if it is determined by said determination that the user is authenticated by the image forming apparatus based on the authentication information received via the local user interface, and refusing execution of processing from the information processing apparatus if it is not determined by said determination that the user has been authenticated,
    wherein the image forming apparatus is capable of communicating with an external apparatus, and the method includes refusing execution of processing from the information processing apparatus if it is determined that the user has been authenticated based on authentication information transmitted from the external apparatus instead of the authentication information received via the local user interface.

6. The method according to claim 5, including permitting, after authentication of a first user, a process for authentication of a second user during use of the image forming apparatus by the first user via the information processing apparatus.

7. The method according to claim 5, including:
    canceling an authenticated state of the user authenticated by the image forming apparatus when the image forming apparatus is in a state connected to the information processing apparatus; and
    managing, when the authenticated state is canceled by said cancellation, the cancellation of the authenticated state of the user and the state connected to the information processing apparatus.

8. The method according to claim 5, wherein the information processing apparatus is a digital camera, and the image forming apparatus performs image formation based on image data transmitted from the digital camera.

9. A non-transitory computer-readable storage medium storing a program for causing a computer to execute a method of controlling an image forming apparatus provided with a local user interface, wherein the method comprises:
    receiving a connection request transmitted from an information processing apparatus;
    determining whether or not a user has been authenticated by the image forming apparatus based on authentication information received via the local user interface, when the connection request is received; and
    permitting execution of processing from the information processing apparatus if it is determined by said determination that the user is authenticated by the image forming apparatus based on the authentication information received via the local user interface, and refusing execution of processing from the information processing apparatus if it is not determined by said determination that the user has been authenticated,
    wherein the image forming apparatus is capable of communicating with an external apparatus, and the method includes refusing execution of processing from the information processing apparatus if it is determined that the user has been authenticated based on authentication information transmitted from the external apparatus instead of the authentication information received via the local user interface.

* * * * *